United States Patent
Watanabe

[11] Patent Number: 6,044,104
[45] Date of Patent: Mar. 28, 2000

[54] CELL SEARCH METHOD AND MOBILE STATION APPARATUS

[75] Inventor: Masatoshi Watanabe, Yokohama, Japan

[73] Assignee: Matsushita Electric Industrial Co., Ltd., Osaka, Japan

[21] Appl. No.: 09/209,277

[22] Filed: Dec. 11, 1998

[30] Foreign Application Priority Data

Dec. 18, 1997 [JP] Japan ................................. 9-364569

[51] Int. Cl.[7] .......................... H04B 15/00; H04B 7/21
[52] U.S. Cl. .................... 375/200; 375/206; 375/347; 375/208; 370/335; 370/342; 370/350
[58] Field of Search .................... 375/200, 206, 375/347, 208, 367; 370/335, 342, 350

[56] References Cited

U.S. PATENT DOCUMENTS

| | | | |
|---|---|---|---|
| 4,730,340 | 3/1988 | Frazier, Jr. . | |
| 4,901,307 | 2/1990 | Gilhousen et al. . | |
| 5,103,459 | 4/1992 | Gilhousen et al. . | |
| 5,528,624 | 6/1996 | Kaku et al. . | |
| 5,684,793 | 11/1997 | Kiema et al. . | |
| 5,726,982 | 3/1998 | Witter . | |
| 5,812,593 | 12/1995 | Kaku ........................ | 375/208 |
| 5,832,021 | 5/1997 | Kondo ....................... | 375/200 |
| 5,889,768 | 8/1996 | Storm et al. ............... | 370/320 |
| 5,894,494 | 10/1997 | Davidovici ................. | 375/208 |
| 5,903,550 | 1/1997 | Spock ........................ | 375/335 |
| 5,903,593 | 2/1997 | Ishiguro et al. ........... | 375/200 |

FOREIGN PATENT DOCUMENTS

| | | | |
|---|---|---|---|
| 0661831 | 7/1995 | European Pat. Off. . | |
| 0 661 831 A2 | 12/1994 | Japan .......................... | H04B 1/707 |
| 94/30025 | 12/1994 | WIPO . | |
| 96/24988 | 8/1996 | WIPO . | |
| 96/31959 | 10/1996 | WIPO . | |

*Primary Examiner*—Wellington Chin
*Assistant Examiner*—Simon Nguyen
*Attorney, Agent, or Firm*—Greenblum & Bernstein, P.L.C.

[57] ABSTRACT

Search control means 8 of a mobile station apparatus divides a search window received into a number of search widths corresponding to the number of search correlators 3 and makes each of correlators 3 carry out correlative detection about these divided search widths simultaneously in a 1st integrating time. It further selects multiple phases in descending order of detected correlative values, makes each correlator carry out correlative detection about these selected phases simultaneously in an integrating time longer than the 1st integrating time and combines powers of correlative values by the number of demodulable phases starting from the largest detected correlative value.

10 Claims, 7 Drawing Sheets

CELL SEARCH METHOD AND MOBILE STATION APPARATUS

BACKGROUND OF THE INVENTION

1. Field of the Invention

The present invention relates to cell search methods and mobile station apparatuses used for cellular systems such as digital car telephones and portable telephones.

2. Description of the Related Art

In cellular radio systems such as car telephones and portable telephones, the FDMA (Frequency Division Multiple Access) system and TDMA (Time Division Multiple Access) system, etc. are conventionally known as multiple access systems in which multiple stations perform communications simultaneously using the same frequency band.

In addition, the CDMA (Code Division Multiple Access) system using a spread spectrum system is a system which achieves higher frequency utilization efficiency and accommodates more users than these techniques.

This spread spectrum refers to a system which transmits a signal which contains information by spreading it to a band wider than the band of the signal. It is divided into two types; a direct sequence (DS) system and frequency hopping (FS) system. Of these two systems, the direct sequence/spread spectrum (DS/SS) system is the mainstream for systems introduced for satellite communications and ground mobile communications because it has the advantage that it can easily be implemented in actual apparatuses.

This spread spectrum communication system is a system in which information signals are spread over a sufficiently wide range of radio bands compared to a minimum required bandwidth, providing excellent confidentiality, secrecy and interference resistance. On the other hand, the direct sequence system is a spread spectrum communication system in which a spreading code is carried on an information signal as it is when it is spread.

In such a CDMA system, it is effective to use codes with a high level of orthogonality as spreading codes for the purpose of increasing the capacity. However, since the number of Walsh codes or orthogonal Gold codes known as codes with a high level of orthogonality is limited to the same number as their code length, securing the number of spreading codes to be assigned to users requires the use of a combination of short codes whose cycle is equal to the symbol length of information and long codes whose cycle is greater than that of these short codes (USP5103459).

In this case, using a method of using one long code for all base station apparatuses in the down link and assigning different long code phases to different base station apparatuses can maintain the orthogonality of all users in the same cell. Furthermore, since signals in other cells are spread with different long code phases, they are converted to noise, making it possible to minimize interference. In a system using such a long code, a mobile station needs to acquire and maintain synchronization of the long code during communication.

In a cellular system, if a mobile station is powered on, or if communication between the mobile station and base station apparatuses is interrupted, or when the mobile station carries out handover, that is, it switches the base station apparatus with which it communicates as the position of the mobile station changes during communication, if the mobile station specifies the switched base station apparatus, the mobile station needs to identify which base station apparatus is currently closest to it and which base station apparatus is the best one to communicate with. This is called "cellular search."

In a cellular system using the CDMA system, one of the cellular search methods is a method in which all base station apparatuses transmit a pilot channel which is spread with the same long code, while a mobile station apparatus carries out correlative detection of all phases of the spreading code of the pilot channel received, and the base station apparatus which is transmitting with the phase having the maximum correlative value, that is, the maximum strength of the pilot channel is identified as the base station apparatus closest to the mobile station apparatus (USP4901307).

Furthermore, there is another method to achieve a speedy cell search: When a mobile station apparatus carries out a cell search while communicating or waiting for communication, the base station apparatus with which it is currently communicating notifies it of the range of the phase presence (called "search window width") estimated from the long code phase information used by base station apparatuses which currently exist in the periphery, differences in the reception timing of the mobile station apparatus due to differences in locations where the peripheral base station apparatuses are installed, and multi-path delay variance, thus limiting the long code phase to be searched by the mobile station apparatus, and hence speeding up a cell search.

In addition, there is a 2-stage pause synchronization capturing method as the method to carry out a high-speed cell search. In the 1st stage of this method, correlative detection is carried out on phases in the search window sequentially with an integrating length which is set every time shorter and if the correlative value exceeds a threshold, the correlative value is obtained with an integrating length long enough to achieve the accuracy of the correlative value, and the strength of the pilot channel is detected in this way.

However, if the mobile station apparatus is moving at a high speed, or if base station apparatuses are clustered close together in big cities, etc. where there is a great number of subscribers, the number of phases to be searched increases and the surrounding cell environment changes quickly, and thus this method has the problem that it requires faster cell search than the conventional technology above. Furthermore, in the 2-stage pause synchronization capturing method, if a threshold to be set is too low, almost all phases need long-hour integration, making it difficult to carry out a high-speed cell search. On the other hand, if a threshold to be set is too high, there is no phase that exceeds this threshold, making a search itself impossible. In particular, this method has the problem that it is difficult to set an appropriate threshold in an ever-changing mobile communication environment.

SUMMARY OF THE INVENTION

The present invention has been implemented taking account of the problems above and it is an objective of the present invention to provide a cellular search method and mobile station apparatus that can carry out a fast cell search during communication or waiting time and reduce power consumption simultaneously.

The present invention divides the search window received from a base station apparatus into a number of search widths corresponding to the number of search correlators and makes each correlator simultaneously carry out correlative detection for these divided search widths in a 1st integrating time.

It further selects multiple phases in high-to-low order of these detected correlation values, makes each correlator simultaneously carry out correlative detection for these selected phases in an integrating time longer than the first one and combines powers of the correlative values by the number of demodulable phases starting from the largest detected correlative value.

This configuration allows multiple search phases to be selected in descending order in the size of detected correlative values, eliminating the necessity of setting thresholds and providing a highly reliable and high-speed cell search.

BRIEF DESCRIPTION OF THE DRAWINGS

FIGS. 3($a$) and 3($b$) illustrate a conceptual drawing of the operations of correlators of a mobile station apparatus according to Embodiment 2 of the present invention;

FIGS. 4($a$) and 4($b$) illustrate a conceptual drawing of the operations of correlators of a mobile station apparatus according to Embodiment 3 of the present invention;

FIGS. 6($a$) and 6($b$) illustrate a conceptual drawing of the operations of correlators of the mobile station apparatus according to Embodiment 4; and FIGS. 7($a$) and 7($b$) illustrate a conceptual drawing of the operations of correlators of a mobile station apparatus according to Embodiment 5 of the present invention.

DESCRIPTION OF THE PREFERRED EMBODIMENTS

With reference now to the attached drawings, the embodiments of the present invention are explained below.
(Embodiment 1)

Figure 1:
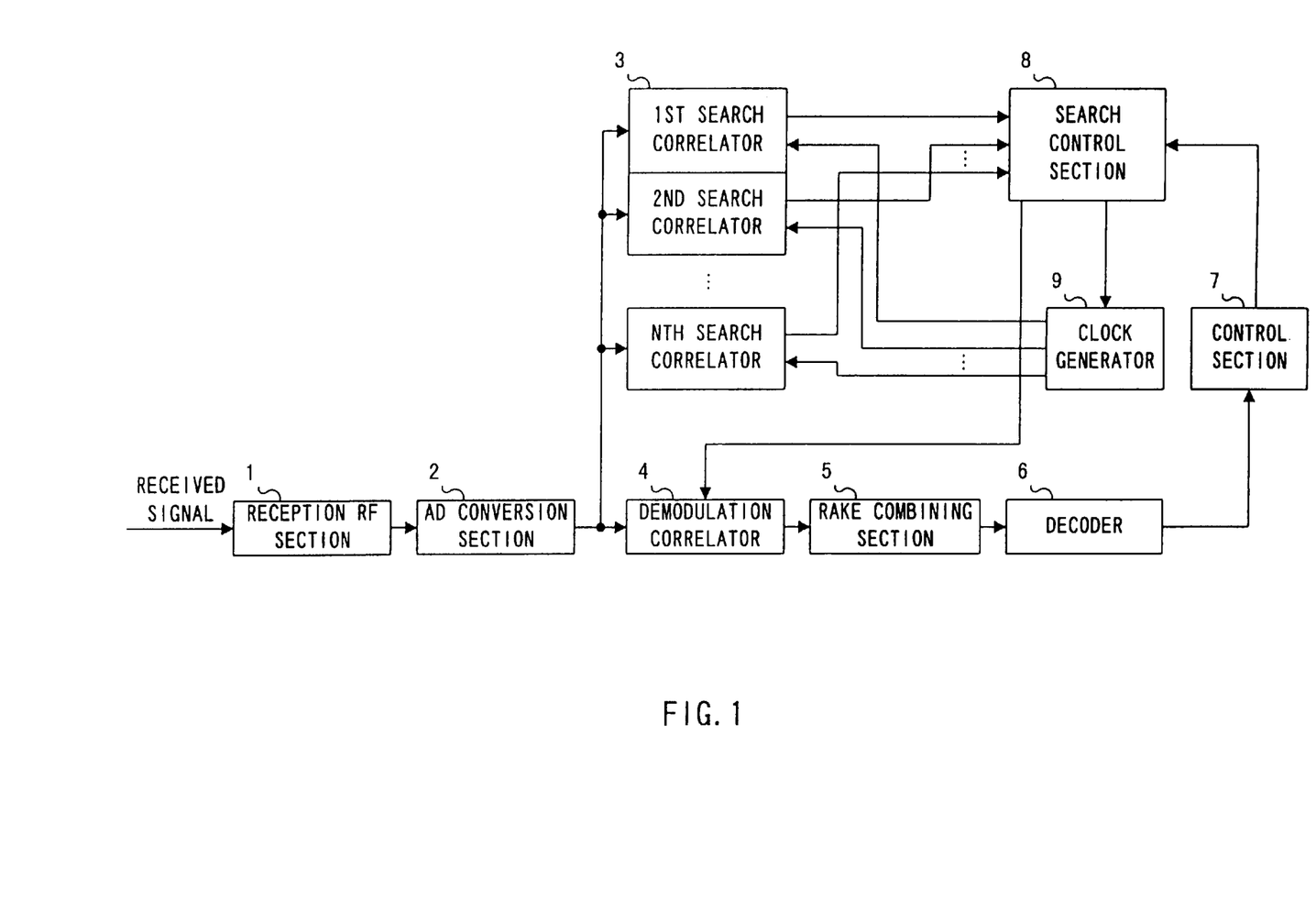
FIG. 1 illustrates a block diagram showing the overall configuration of a mobile station apparatus according to Embodiment 1 of the present invention.

FIG. 1 is a block diagram showing the overall configuration of a mobile station apparatus according to Embodiment 1 of the present invention. When a signal transmitted from a base station apparatus which is not shown in the figure is received, the received signal is input to reception RF section 1 and converted to a baseband signal. AD conversion section 2 converts this baseband signal from analog to digital. This digital signal is input to the 1st to Nth correlators 3 and demodulation correlator 4. Demodulation correlator 4 carries out despreading on the input signal using a code over which a data channel is spread and the reception timing input from search control section 8 that will be described later. RAKE combining section 5 carries out RAKE combining on the output of this demodulation correlator 4. Decoder 6 carries out error correction decoding on the output of this RAKE combining section 5 and outputs the received data. Control section 7 separates the phase and search window width of a base station apparatus subject to a cell search from the received data input from decoder 6 and outputs it to search control section 8.

On the other hand, the 1st to Nth search correlators 3 operate on the operating clock input from clock generator 9 and detect a correlative value of the pilot channel at a phase that is not shown in the figure indicated from search control section 8 on the digital signal input from AD converter 3 and outputs this detected correlative value to search control section 8. Search control section 8 uses the search phase and search window width input from control section 7 to indicate the phase subject to correlation detection to the 1st to Nth search correlators 3 and outputs the control signal to clock generator 9. Clock generator 9 outputs the operating clock to the 1st to Nth search correlators 3 according to the control signal input from search control section 8.

Then, the operation for a cell search of the mobile station apparatus configured as shown above during a waiting time or communication is explained below.

When search control section 8 tries to measure the strength of the pilot channel of a base station apparatus using the search phase and search window width of a peripheral base station apparatus received from a base station apparatus with which it is communicating, it divides this search window into N portions and assigns these divided windows to the 1st to Nth search correlators 3. These 1st to Nth search correlators 3 find correlative values in a short integrating time for all phases within the divided windows and outputs these correlative values to search control section 8.

Figure 2:
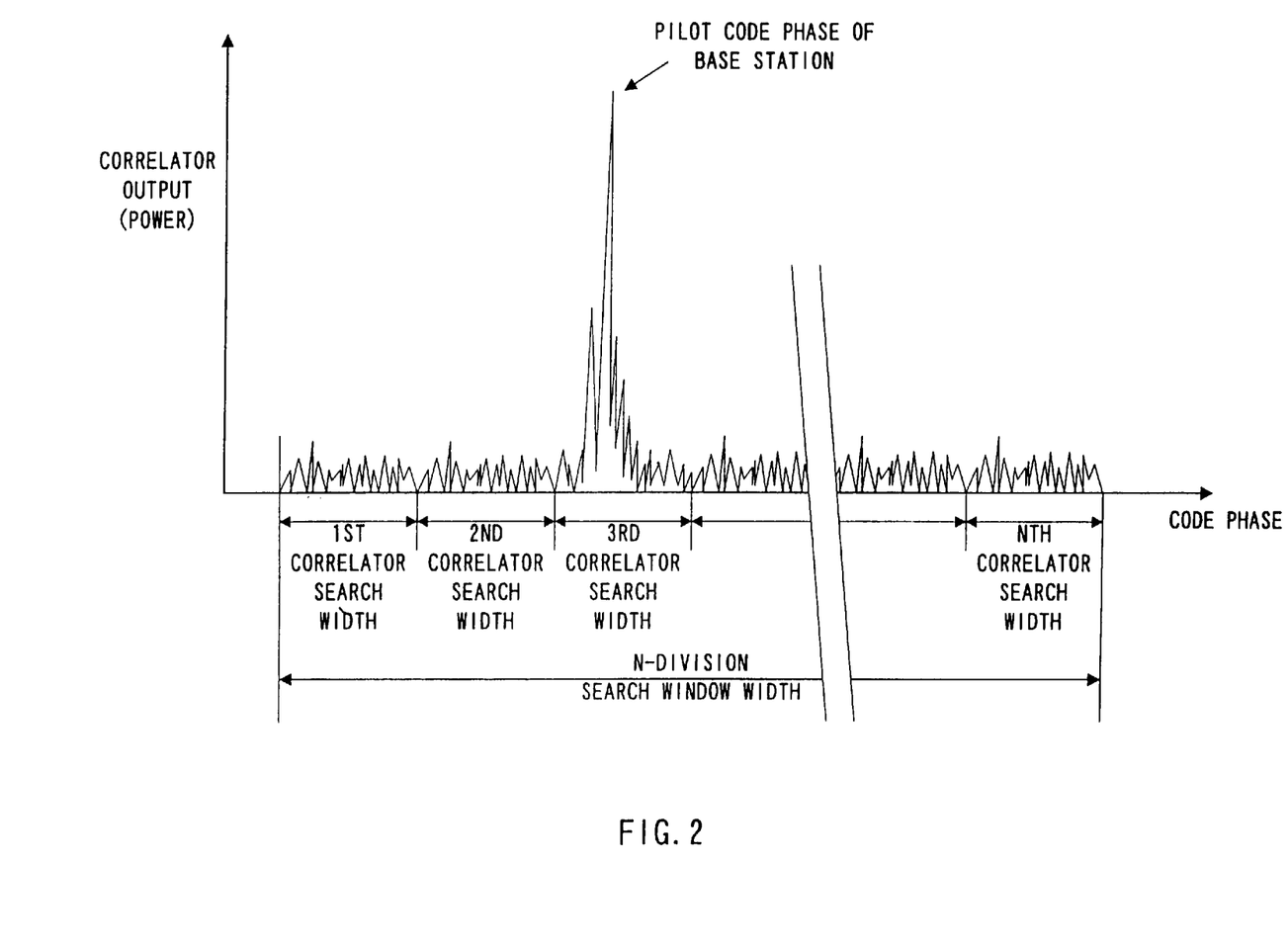
FIG. 2 illustrates a divided conceptual drawing of a search window of the mobile station apparatus according to Embodiment 1 of the present invention.

As a result, the correlative values within the entire search window as shown in FIG. 2 are obtained. Since the outputs of these correlators 3 use a short integrating time to shorten a search time, they do not suppress interference or noise sufficiently nor achieve the accuracy to carry out cell judgment. Therefore, search control section 8 rearranges the correlative values in the order of electrical power and selects multiple phases starting with the one with the maximum power and assigns the selected phases equally to the 1st to Nth correlators 3 to operate correlators 3. The 1st to Nth correlators 3 detect correlative values in an integrating time long enough to obtain the accuracy to carry out cell judgment on the specified phases and output them to search control section 8.

Search control section 8 further rearranges the correlative values obtained in the order of electrical power and selects correlative values by the number of demodulable phases from the top and combines these selected correlative values to obtain the strength of the pilot channel of this base station apparatus. The number of demodulable phases depends on the number of multi-paths that can be combined by demodulation correlator 4 and RAKE combining section 5.

The operation above is repeated by the number of base stations notified to measure the strength of the pilot channels of all peripheral base station apparatuses received from the base station apparatus with which it is communicating.

As shown above, dividing the search window into portions, assigning them to multiple correlators, obtaining correlative values for all phases within the search window, and judging the maximum value eliminate the necessity of setting thresholds, etc., allowing a high-speed cell search.
(Embodiment 2)

Then, the mobile station apparatus according to Embodiment 2 of the present invention is explained below. Search control section 8 of the mobile station apparatus according to Embodiment 2 of the present invention has a function of inserting a time for each of correlators 3 to stop its operation during a cell search cycle. Since the rest of the configuration is the same as that in Embodiment 1 above, the explanation of the overall configuration is omitted here.

Figure 3:
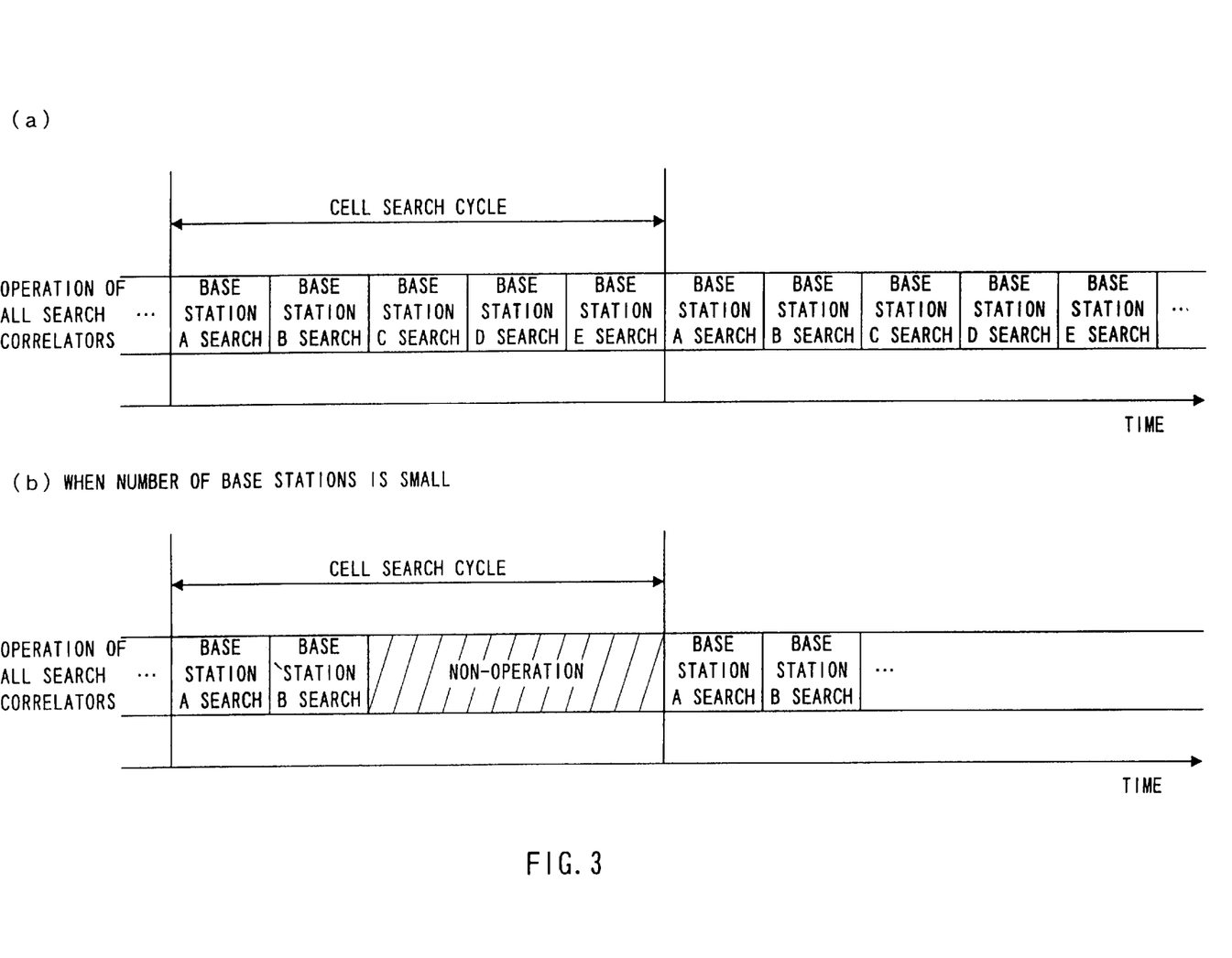

Then, the operation of the mobile station apparatus according to Embodiment 2 of the present invention is explained with reference to FIG. 3. FIG. 3 is a conceptual drawing showing the operation of the correlators in the mobile station apparatus according to Embodiment 2.

FIG. 3($a$) illustrates the operations of search correlators 3 on a time scale when the phases of 5 base station apparatuses A to E as peripheral base station apparatuses are notified from a base station apparatus with which it is communicating.

On the other hand, FIG. 3(b) illustrates the operations of search correlators 3 when base station apparatuses are installed at a large interval in suburbs for example with two base station apparatuses to be notified. As shown in this figure, if the number of base station apparatuses to be searched is small, search control section 8 controls clock generator 9 so that it should not output the operating clock to search correlators 3. This control allows a non-operation time to be inserted during a cell search cycle even if the mobile station apparatus moves to a place where only a few base station apparatuses exist, making it possible to keep the cell search cycle constant. This reduces power consumption without deteriorating the search performance.

As shown above, the mobile station apparatus according to Embodiment 2 of the present invention is capable of inserting a non-operation time of search correlators 3 even when it moves to a place where there are fewer base station apparatuses, making it possible to reduce power consumption without deteriorating the cell search cycle, that is, search performance.

(Embodiment 3)

The mobile station apparatus according to Embodiment 3 of the present invention is explained below. Search control section 8 of the mobile station apparatus according to Embodiment 3 of the present invention sets a longer time for each of correlators 3 to stop its operation when the search window width is small. The rest of the configuration is the same as that of Embodiment 1 above, and thus the explanation of its overall configuration is omitted here.

Figure 4:
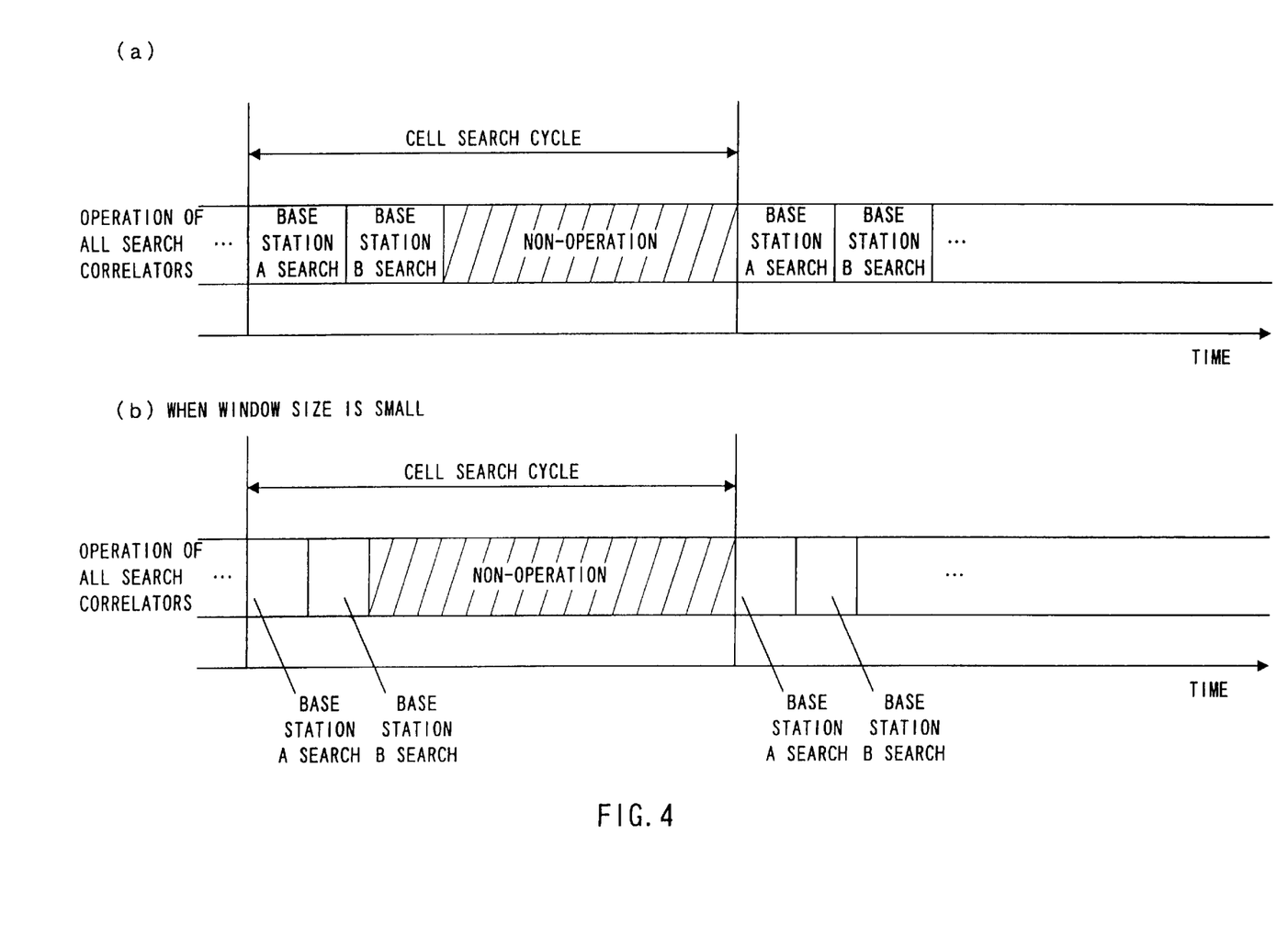

Then, the operation of the mobile station apparatus according to Embodiment 3 of the present invention is explained with reference to FIG. 4. FIG. 4 is a conceptual drawing showing the operations of the correlators of the mobile station apparatus according to Embodiment 3.

FIG. 4(a) shows the operations of search correlators 3 on a time scale when phases of two base station apparatuses A and B as peripheral base station apparatuses are notified from a base station apparatus with which it is communicating.

On the other hand, FIG. 4(b) shows the operations of the correlators when the search window width notified from the base station apparatus is small. As shown in - this figure, since the search time per one base station apparatus is short when the window width to be searched is small, search control section 8 controls so that a non-operation time of search correlators 3 may be set longer. Such control makes it possible to reduce power consumption without changing the cell search cycle.

As shown above, the mobile station apparatus according to Embodiment 3 of the present invention is capable of reducing power consumption without deteriorating the cell search cycle, that is, search performance even when the search window width notified from the base station apparatus is small.

(Embodiment 4)

Figure 5:
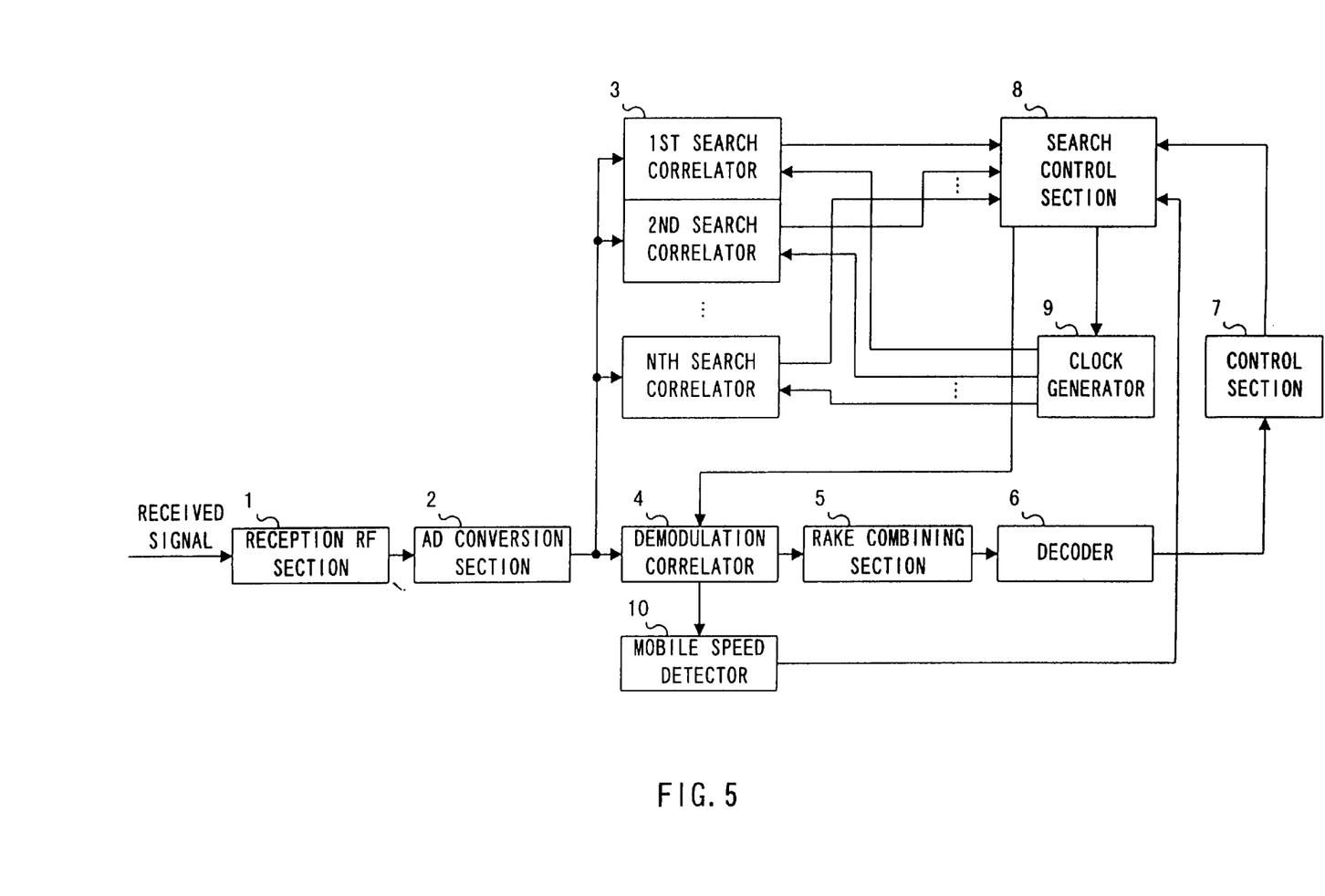
FIG. 5 illustrates a block diagram showing the overall configuration of a mobile station apparatus according to Embodiment 4 of the present invention.

Then, the mobile station apparatus according to Embodiment 4 of the present invention is explained below. FIG. 5 is a block diagram showing the configuration of the mobile station apparatus according to Embodiment 4 of the present invention. As shown in FIG. 5, Embodiment 4 is provided with mobile speed detector 10 in addition to the mobile station apparatus according to Embodiment 1. This mobile speed detector 10 detects a relative value of the mobile speed by detecting the time variation speed of correlative values with respect to the output of demodulation correlator 4 and outputs it to search control section 8. The rest of the configuration is the same as that of Embodiment 1 above, and thus its explanation is omitted here.

Figure 6:
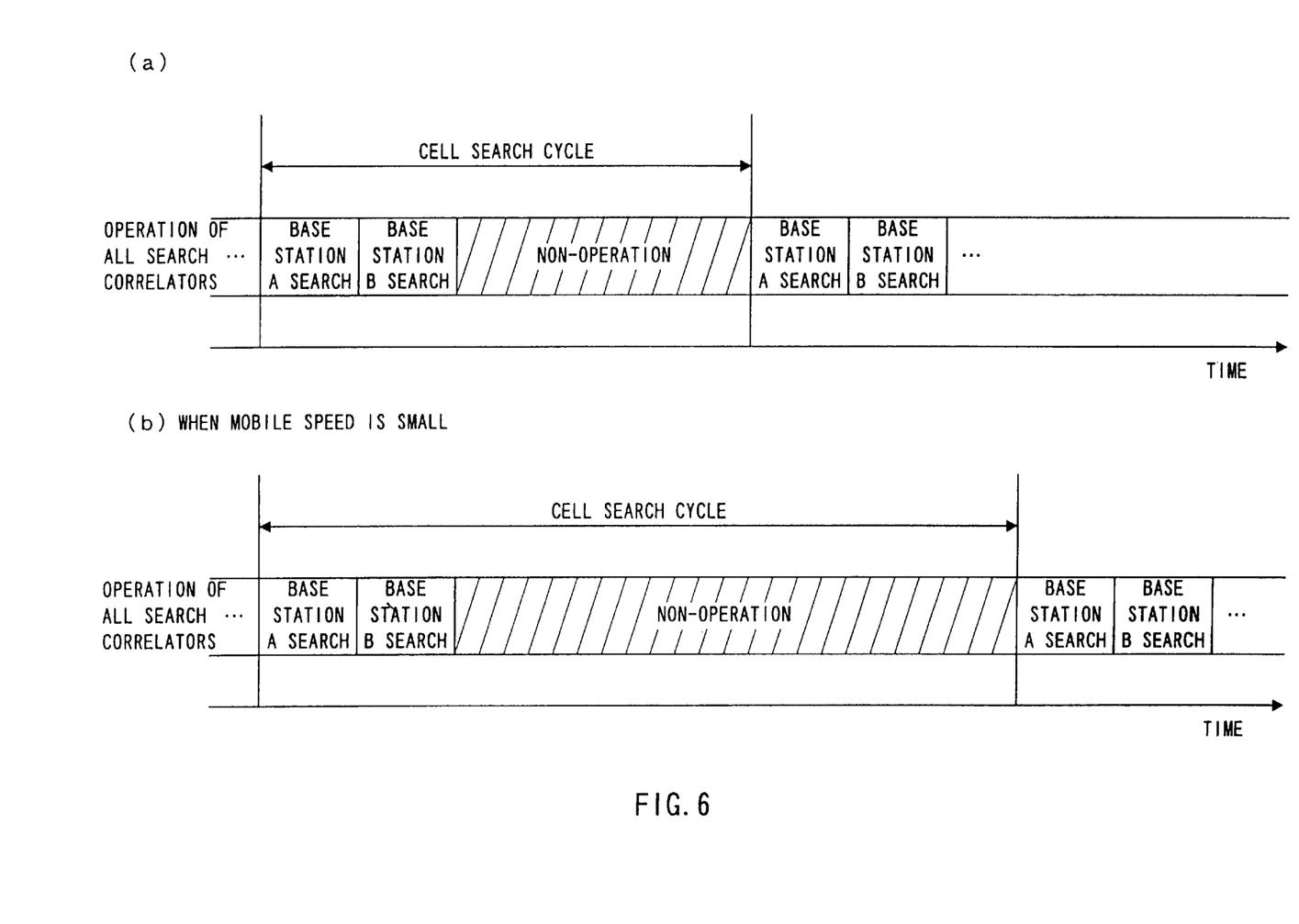

Then, the operation of the mobile station apparatus according to Embodiment 4 of the present invention is explained below. FIG. 6 is a conceptual drawing showing the operations of the correlators of the mobile station apparatus according to Embodiment 4.

FIG. 6(a) shows the operations of search correlators 3 on a time scale when phases of two base station apparatuses A and B as peripheral base station apparatuses are notified from a base station apparatus with which it is communicating.

On the other hand, FIG. 6(b) shows the operations of the correlators when the mobile speed detected by mobile speed detector 10 is small. As shown in this figure, the search window width notified from each base station apparatus is the same as that of FIG. 6(a), but search control section 8 sets it so that a non-operation time of search correlators 3 may be longer. That is, if the mobile speed is small, the cell environment surrounding the mobile station apparatus changes slowly and thus the cell search cycle can be set longer. Therefore, power consumption can be reduced by search control section 8 setting a longer non-operation time for the search correlators 3.

As shown above, the mobile station apparatus according to Embodiment 4 of the present invention can set a longer non-operation time for the search correlators 3 when the mobile speed of the mobile station apparatus is small, making it possible to reduce power consumption.

(Embodiment 5)

Then, the mobile station apparatus according to Embodiment 5 of the present invention is explained below. Search control section 8 of the mobile station apparatus according to Embodiment 5 of the present invention stops the operations of some correlators and controls them so that the number of active search correlators may be smaller when the number of base station apparatuses to be searched is small. The rest of the configuration is the same as that of Embodiment 1 or Embodiment 4 above, and thus the explanation of its overall configuration is omitted here.

Figure 7:
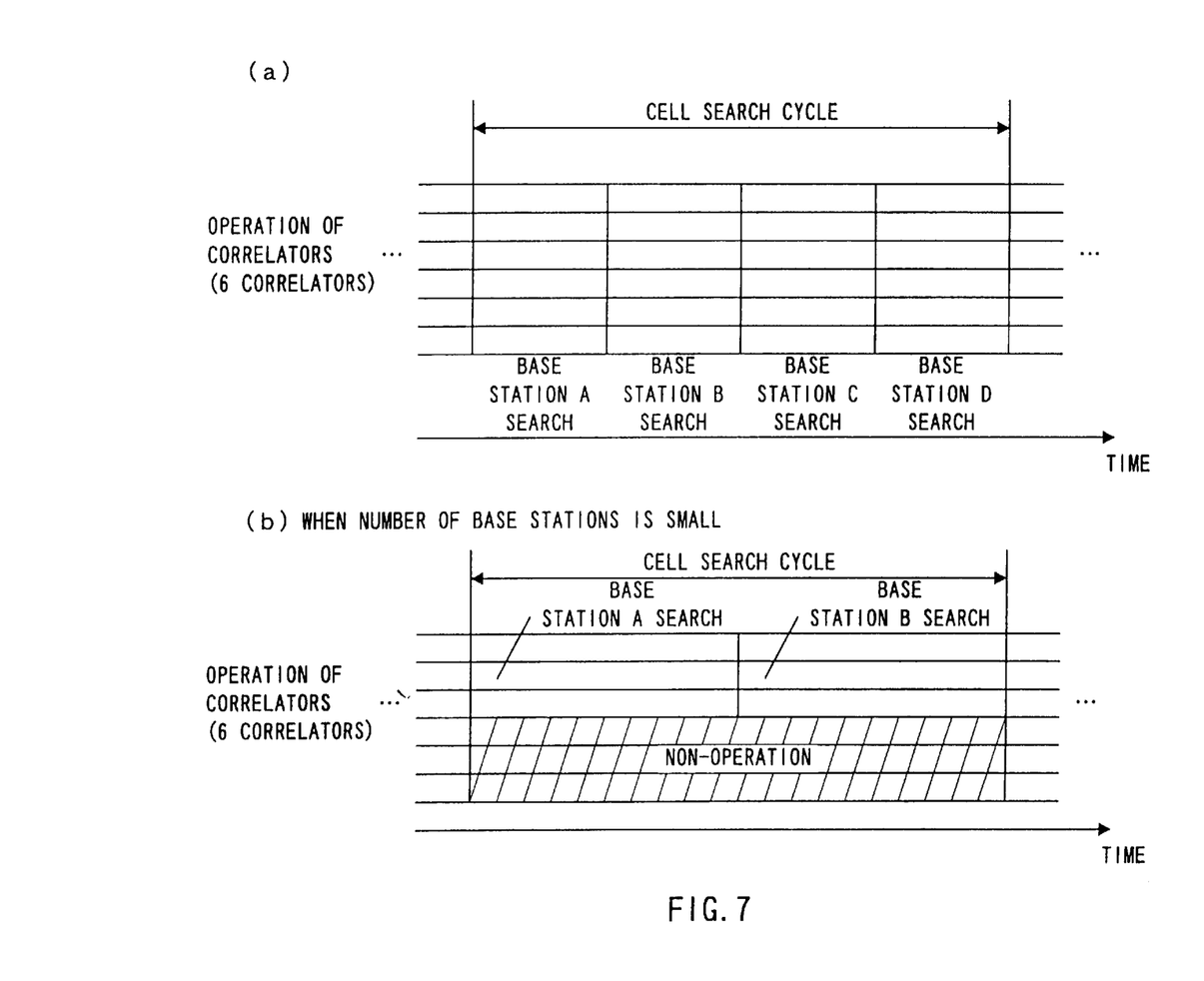

Then, the operation of the mobile station apparatus according to Embodiment 5 of the present invention is explained with reference to FIG. 7. FIG. 7 is a conceptual drawing showing the operations of the correlators of the mobile station apparatus according to Embodiment 5 of the present invention.

FIG. 7(a) shows the operations of the search correlators on a time scale when phases of four base station apparatuses A to D as peripheral base station apparatuses are notified from a base station apparatus with which it is communicating. As shown in FIG. 7, Embodiment 5 uses six search correlators 3. The time after it starts to search base station apparatus A until it starts to search base station apparatus A again corresponds to the cell search cycle.

On the other hand, FIG. 7(b) shows the operations of search correlators 3 when the number of base station apparatuses to be notified is 2. As shown in this figure, search control section 8 controls clock generator 9 so that the number of active search correlators 3 may be decreased. As a result, the number of active search correlators is decreased, while the search time per one baste station is increased. However, this control reduces the number of active correlators, making it possible to reduce power consumption.

As shown above, the mobile station apparatus according to Embodiment 5 of the present invention can reduce the number of active correlators when it moves to a place where there are fewer base station apparatuses, making it possible to reduce power consumption.

As seen clearly from the explanation above, the present invention can operate multiple correlators by dividing the search window and select multiple search phases in descending order of detected correlative values, making it possible to implement a high reliability and high-speed cell search without setting thresholds. Furthermore, when there is no need to carry out a high-speed cell search, it can stop more than one correlator and insert a time for the correlators to stop during the cell search cycle, allowing a reduction of power consumption without deteriorating the search performance.

This application is based on the Japanese Patent Application No. HEI 9-364569 filed on Dec. 18, 1997, entire content of which is expressly incorporated by reference herein.

What is claimed is:

1. A cell search method comprising:
   receiving information with respect to a search window from a base station apparatus;
   dividing the search window of a base station apparatus to be searched into a plurality of search widths;
   detecting a correlation of each of the plurality of search widths in parallel to obtain a correlation value in a first integrating time;
   selecting a phase in order of larger correlation value;
   detecting the correlations of each of these selected phases in a second integrating time longer than the first integrating time;
   combining the correlation values by the number of demodulable phases starting from the largest detected correlation value; and
   keeping the cell search cycle constant when the number of peripheral base station apparatuses whose search window is notified from the base station apparatus is less than a predetermined value, by inserting a non-operation time after a search ends.

2. The cell search method according to claim 1, further comprising the step of changing the non-operation time to be inserted after a cell search ends according to the change of the window width to keep the cell search cycle constant.

3. The cell search method according to claim 1, further comprising the step of controlling the number of correlation detection performed in parallel according to the number of peripheral base station apparatuses.

4. The cell search method according to claim 1, further comprising the step of detecting the mobile speed of the mobile station apparatus itself;
   setting a longer cell search cycle according to deceleration of the mobile speed; and
   inserting a non-operation time to fill the remaining time of the cell search cycle after a search ends.

5. A mobile station apparatus, comprising:
   a plurality of search correlators for detecting a correlation of a pilot channel assigned to a base station apparatus to be searched to obtain a correlation value;
   search control means for controlling phases to be detected according to the correlation and operations of the search correlators;
   reception means for receiving a code phase and search window of a pilot channel assigned to a peripheral base station apparatus;
   wherein said search control means divides said received search window into a plurality of search widths corresponding to the number of said search correlators, makes each correlator detect the correlation of the divided search width simultaneously in a 1st integrating time to obtain the correlation value, selects a plurality of phases in order of larger correlation value in descending order of these detected correlative values, makes each correlator detect the correlation of each of the selected phases simultaneously in an integrating time longer than the first integrating time to obtain the correlation values, and combines the correlation values by the number of demodulable phases starting from the largest detected correlation value; and
   wherein search control means inserts a non-operation time after a search ends when the number of peripheral base station apparatuses whose search window is notified from the base station is less than a predetermined value to which the base station apparatus notified the search window falls short of a given number.

6. The mobile station apparatus according to claim 5, wherein:
   search control means keeps a cell search cycle constant by changing the non-operation time to be inserted after a cell search ends according to a change to the window width.

7. The mobile station apparatus according to claim 5, wherein:
   search control means changes the number of correlators used in detecting correlation values for detection of correlative values according to the number of peripheral base station apparatuses.

8. The mobile station apparatus according to claim 5, comprising mobile speed detection means for detecting the mobile speed of the mobile station apparatus itself, wherein:
   said search control means sets a longer cell search cycle according to deceleration of said mobile speed detected and inserts a non-operation time to fill the remaining time of the cell search cycle after a search ends.

9. A base station apparatus, which carries out communications with the mobile station apparatus according to claim 5.

10. A communication system, comprising a base station apparatus having communication means for notifying the code phase and search window width of a pilot channel used by a peripheral base station apparatus to a mobile station apparatus, and the mobile station apparatus according to claim 5.

* * * * *